United States Patent
Hasegawa et al.

(10) Patent No.: US 11,210,955 B2
(45) Date of Patent: Dec. 28, 2021

(54) COLLISION AVOIDANCE ASSIST APPARATUS

(71) Applicant: TOYOTA JIDOSHA KABUSHIKI KAISHA, Toyota (JP)

(72) Inventors: Takashi Hasegawa, Ashigarakami-gun (JP); Yuji Yoshioka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 443 days.

(21) Appl. No.: 16/443,940

(22) Filed: Jun. 18, 2019

(65) Prior Publication Data
US 2020/0066161 A1 Feb. 27, 2020

(30) Foreign Application Priority Data
Jun. 19, 2018 (JP) .............................. JP2018-116180

(51) Int. Cl.
*G08G 1/16* (2006.01)
*B60W 30/08* (2012.01)

(52) U.S. Cl.
CPC ............. *G08G 1/167* (2013.01); *B60W 30/08* (2013.01); *G08G 1/166* (2013.01); *G08G 1/161* (2013.01)

(58) Field of Classification Search
CPC ...... B62D 15/00; B62D 15/02; B62D 15/021; B62D 15/025; B62D 15/029; B62D 15/0295; B60W 30/08; B60W 30/085; B60W 30/09; B60W 30/095; B60W 30/0956; G08G 1/16; G08G 1/166; G08G 1/167
See application file for complete search history.

(56) References Cited

U.S. PATENT DOCUMENTS

| | | | | |
|---|---|---|---|---|
| 9,650,040 B2* | 5/2017 | Minemura | ............ | G01S 13/867 |
| 2015/0274164 A1* | 10/2015 | Terazawa | ............ | B62D 15/025 |
| | | | | 701/41 |
| 2015/0336574 A1 | 11/2015 | Akiyama | | |
| 2016/0207534 A1 | 7/2016 | Nishimura et al. | | |
| 2016/0368534 A1* | 12/2016 | Harda | .................... | H04N 7/181 |

FOREIGN PATENT DOCUMENTS

| | | |
|---|---|---|
| JP | 11-148394 A | 6/1999 |
| JP | 2010-72839 A | 4/2010 |
| JP | 2010-097400 A | 4/2010 |
| JP | 2016-18354 A | 2/2016 |
| JP | 2016-132374 A | 7/2016 |
| WO | 2014/122755 A1 | 8/2014 |

* cited by examiner

*Primary Examiner* — Van T Trieu
(74) *Attorney, Agent, or Firm* — Sughrue Mion, PLLC

(57) ABSTRACT

A collision avoidance assist apparatus is provided with: a determinator configured to determine whether or not one lane on which a host vehicle drives is inner than another lane that extends along the one lane and that a moving body exists, in a curve section, if there is the curve section ahead in a travel direction of the host vehicle; and a changer configured to change an operating condition for a collision avoidance operation such that a first condition, which is the operating condition in a first case in which it is determined that the one lane is not inner than the other lane in the curve section, is more easily satisfied than a second condition, which is the operating condition in a second case in which it is determined that the one lane is inner than the other lane in the curve section.

10 Claims, 3 Drawing Sheets

COLLISION AVOIDANCE ASSIST APPARATUS

CROSS-REFERENCE TO RELATED APPLICATIONS

This application is based upon and claims the benefit of priority of the prior Japanese Patent Application No. 2018-116180, filed on Jun. 19, 2018, the entire contents of which are incorporated herein by reference.

BACKGROUND OF THE INVENTION

1. Field of the Invention

Embodiments of the present invention relate to a collision avoidance assist apparatus.

2. Description of the Related Art

For example, if at least one of a host vehicle and an oncoming vehicle drives a curve, crossing between a predicted course of the host vehicle and a predicted course of the oncoming vehicle possibly causes a collision avoidance assist to be performed on this type of apparatus, even though the collision avoidance assist is unnecessary.

For this problem, for example, if at least one of the host vehicle and the oncoming vehicle drives the curve, there is proposed a technology/technique of preventing or suppressing an unnecessary avoidance control regarding the oncoming vehicle, by reducing a predicted moving time from a normal time, wherein the predicted moving time is a time predicted for the at least one vehicle to drive, with a current travel direction maintained (refer to Japanese Patent Application Laid Open No. 2016-132374 (Patent Literature 1)). Alternatively, there is proposed a technology/technique in which if a road ahead of the host vehicle is a curve and if there is an oncoming vehicle that drives the curve, an execution condition for performing a collision avoidance control is changed depending on whether the curve is a right curve or a left curve as viewed from the host vehicle (refer to Japanese Patent Application Laid Open No. 2010-097400 (Patent Literature 2)).

There is room for improvement in the technologies/techniques described in the Patent Literatures 1 and 2.

SUMMARY

In view of the aforementioned situation, it is therefore an object of embodiments of the present disclosure to provide a collision avoidance assist apparatus that can appropriately perform an operation associated with collision avoidance while preventing the operation from being performed even though the operation is unnecessary.

The above object of embodiments of the present disclosure can be achieved by a collision avoidance assist apparatus configured to perform a collision avoidance assist operation for avoiding a collision between a host vehicle and an object around the host vehicle if a time to collision, which is a time until the host vehicle collides with the object, satisfies a predetermined operating condition, the collision avoidance assist apparatus provided with: a determinator configured to determine whether or not one lane on which the host vehicle drives is inner than another lane that extends along the one lane and that a moving body as the object exists, in a curve section, if there is the curve section ahead in a travel direction of the host vehicle; and a changer configured to change the operating condition such that a first condition, which is the operating condition in a first case in which it is determined that the one lane is not inner than the other lane in the curve section, is more easily satisfied than a second condition, which is the operating condition in a second case in which it is determined that the one lane is inner than the other lane in the curve section.

DETAILED DESCRIPTION OF THE EMBODIMENT

A collision avoidance assist apparatus according to an embodiment of the present disclosure will be explained with reference to FIG. 1 to FIG. 3B.

Configuration

Figure 1:
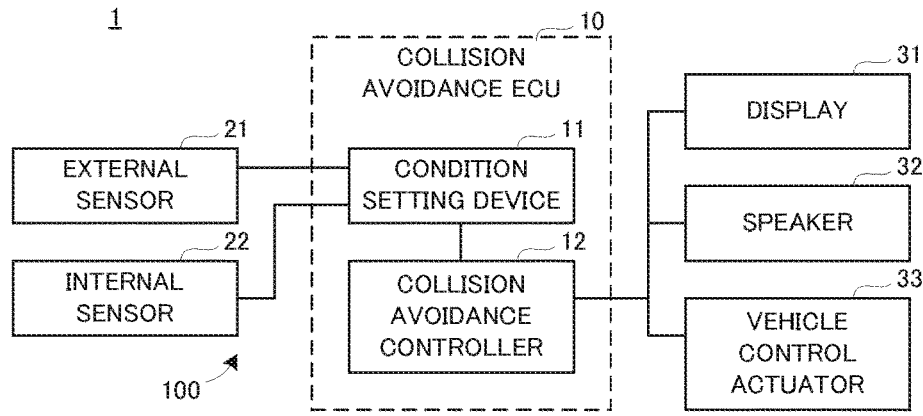
FIG. 1 is a block diagram illustrating a configuration of a collision avoidance assist apparatus according to an embodiment.

A configuration of the collision avoidance assist apparatus according to the embodiment will be explained with reference to FIG. 1. FIG. 1 is a block diagram illustrating a configuration of the collision avoidance assist apparatus according to the embodiment.

In FIG. 1, a collision avoidance assist apparatus 100 is mounted on a vehicle 1. The collision avoidance assist apparatus 100 is configured to perform a collision avoidance assist operation for avoiding a collision between the vehicle 1 and an object (e.g., another vehicle, a structure, etc.) around the vehicle 1. The collision avoidance assist apparatus 100 is provided with a collision avoidance electronic control unit (ECU) 10, an external sensor 21, an internal sensor 22, a display 31, a speaker 32, and a vehicle control actuator 33.

The external sensor 21 includes, for example, a millimeter wave sensor, a laser sensor, a light detection and ranging (LIDAR), a global positioning system (GPS), a camera for imaging a scene around the vehicle 1, and the like. The internal sensor 22 includes a vehicle speed sensor, an acceleration sensor, a yaw rate sensor, and the like. The external sensor 21, the internal sensor 22, the display 31, the speaker 32, and the vehicle control actuator 33 are not necessarily provided only for the collision avoidance assist apparatus 100, but may be shared by another apparatus mounted on the vehicle 1.

The collision avoidance ECU 10 is provided with a condition setting device 11 and a collision avoidance controller 12, as processing blocks logically realized therein or processing circuits physically realized. The condition setting device 11 is configured to set an operating condition for allowing the collision avoidance assist operation to be started by the collision avoidance assist apparatus 100. The collision avoidance controller 12 is configured to alert a driver of the vehicle 1 via at least one of the display 31 and the speaker 32, or to control the vehicle control actuator 33 to decelerate the vehicle 1, as a part of the collision avoidance assist operation.

Technical Problem of Collision Avoidance Assist Operation on Curve

Figure 2A:
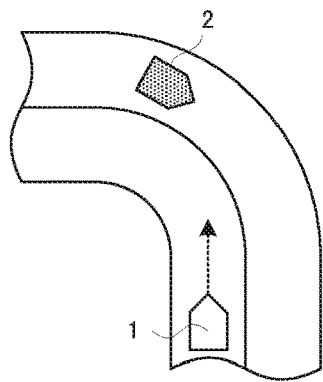
FIG. 2A is a diagram for explaining a vehicle behavior in a curve section.
Figure 2B:
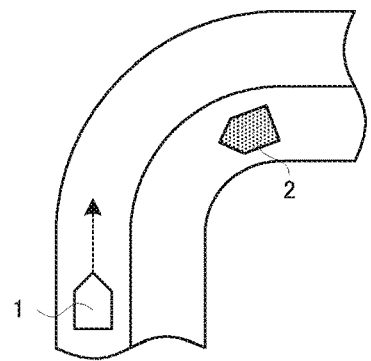
FIG. 2B is a diagram for explaining a vehicle behavior in a curve section.
Figure 2C:
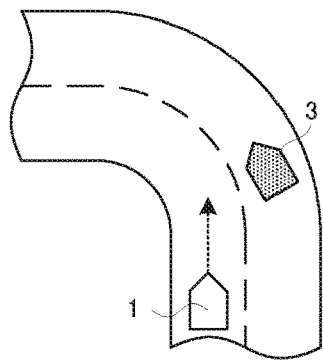
FIG. 2C is a diagram for explaining a vehicle behavior in a curve section.
Figure 2D:
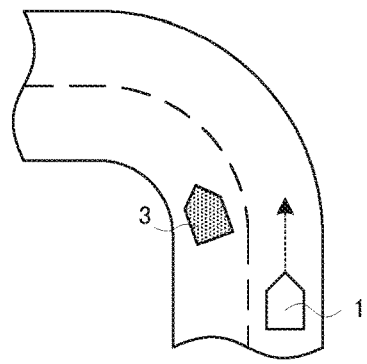
FIG. 2D is a diagram for explaining a vehicle behavior in a curve section.

Now, a technical problem of the collision avoidance assist operation will be explained with reference to FIG. 2A to FIG. 2D. FIG. 2A to FIG. 2D are diagrams for explaining a vehicle behavior in a curve section. FIG. 2A and FIG. 2B illustrate a situation in which the vehicle 1 and oncoming vehicle 2 pass by each other. FIG. 2C and FIG. 2D illustrate a situation in which there is a parallel running vehicle 3 that runs in parallel with the vehicle 1, wherein the "parallel running" conceptually includes not only "running in parallel with the vehicle 1", but also "moving in the same direction as a travel direction associated with a lane on which the vehicle 1 drives". In FIG. 2A to FIG. 2D, it is assumed that the vehicle 1 is driving near an entrance of the curve.

The collision avoidance assist operation may be performed when there is a relatively high possibility of a collision between the vehicle 1 and the object. The collision avoidance assist apparatus 100 may use time to collision (TTC) or enhanced time to collision (ETTC), as an index indicating the possibility of the collision. Then, if a value of TTC or ETTC is less than or equal to a predetermined threshold value included in the operating condition, which is set by the condition setting device 11, the collision avoidance assist operation may be performed. As the value of TTC or ETTC decreases, the possibility of the collision increases.

In a situation illustrated in FIG. 2A, when the oncoming vehicle 2 is viewed from the vehicle 1, the oncoming vehicle 2 crosses ahead in a travel direction of the vehicle 1 (refer to a dotted arrow). At this time, the vehicle 1 moves toward the oncoming vehicle 2 that crosses ahead. Thus, the TTC or ETTC of the vehicle 1 for the oncoming vehicle 2 is relatively small. On the other hand, because a centrifugal force acts on the oncoming vehicle 2 on the curve, a track of the oncoming vehicle 2 is more likely shifted to the outside of the curve, rather than to the inside of the curve (i.e., to the vehicle 1 side). In other words, in the situation illustrated in FIG. 2A, even though an actual possibility of the collision between the vehicle 1 and the oncoming vehicle 2 is relatively small, an unnecessary collision avoidance assist operation is likely performed due to the relatively small TTC or ETTC of the vehicle 1 for the oncoming vehicle 2.

In a situation illustrated in FIG. 2B, when the oncoming vehicle 2 is viewed from the vehicle 1, the oncoming vehicle 2 does not cross ahead in the travel direction of the vehicle 1. If a distance between the vehicle 1 and the oncoming vehicle 2 is relatively far, a predicted course of the vehicle 1 crosses a predicted course of the oncoming vehicle 2, but if the distance is relatively close, the predicted course of the vehicle 1 does not cross the predicted course of the oncoming vehicle 2 due to the curve. Thus, the oncoming vehicle 2 does not correspond to an object that possibly collides with the vehicle 1 (referred to as a "collision candidate object" as occasion demands). Therefore, the TTC or ETTC of the vehicle 1 for the oncoming vehicle 2 is not that small. On the other hand, as described above, the track of the oncoming vehicle 2 is more likely shifted to the outside of the curve (i.e., to the vehicle 1 side). In other words, in the situation illustrated in FIG. 2B, the actual possibility of the collision between the vehicle 1 and the oncoming vehicle 2 is relatively large, even though the TTC or ETTC of the vehicle 1 for the oncoming vehicle 2 is not that small. At this time, for example, if the oncoming vehicle 2 enters the lane on which the vehicle 1 drives under the assumption that the predetermined threshold value described above is fixed regardless of a road shape, then, the start of the collision avoidance assist operation is possibly delayed, and a collision damage reducing effect is possibly reduced.

In a situation illustrated in FIG. 2C, when the parallel running vehicle 3 is viewed from the vehicle 1, the parallel running vehicle 3 crosses ahead in the travel direction of the vehicle 1. At this time, the vehicle 1 moves toward the parallel running vehicle 3 that crosses ahead. Thus, the TTC or ETTC of the vehicle 1 for the parallel running vehicle 3 is relatively small. On the other hand, a track of the parallel running vehicle 3 is more likely shifted to the outside of the curve, rather than to the inside of the curve (i.e., to the vehicle 1 side). In other words, in the situation illustrated in FIG. 2C, even though an actual possibility of the collision between the vehicle 1 and the parallel running vehicle 3 is relatively small, an unnecessary collision avoidance assist operation is likely performed due to the relatively small TTC or ETTC of the vehicle 1 for the parallel running vehicle 3.

In a situation illustrated in FIG. 2D, when the parallel running vehicle 3 is viewed from the vehicle 1, the parallel running vehicle 3 does not cross ahead in the travel direction of the vehicle 1. If a distance between the vehicle 1 and the parallel running vehicle 3 is relatively close, a predicted course of the parallel running vehicle 3 is along the predicted course of the vehicle 1. Thus, the parallel running vehicle 3 highly likely does not correspond to the collision candidate object. Therefore, the TTC or ETTC of the vehicle 1 for the parallel running vehicle 3 is not that small. On the other hand, as described above, the track of the parallel running vehicle 3 is more likely shifted to the outside of the curve (i.e., to the vehicle 1 side). In other words, in the situation illustrated in FIG. 2D, the actual possibility of the collision between the vehicle 1 and the parallel running vehicle 3 is relatively large, even though the TTC or ETTC of the vehicle 1 for the parallel running vehicle 3 is not that small. At this time, for example, if the parallel running vehicle 3 enters the lane on which the vehicle 1 drives under the assumption that the predetermined threshold value described above is fixed regardless of the road shape, then, the start of the collision avoidance assist operation is possibly delayed, and the collision damage reducing effect is possibly reduced.

Collision Avoidance Assist Operation

Considering the technical problems explained with reference to FIG. 2A to FIG. 2D, the operating condition for starting the collision avoidance assist operation is set by the condition setting device 11 on the collision avoidance assist apparatus 100 in view of a positional relation between the vehicle 1 and the other vehicle, which is the collision candidate object (i.e., the oncoming vehicle 2 or the parallel running vehicle 3), on the curve.

A case where the vehicle 1 drives the curve on an inner side than the other vehicle does (refer to FIG. 2A and FIG.

2C), in other words, a case where the lane on which the vehicle 1 drives is inner than a lane on which the other vehicle drives, will be hereinafter referred to as an "inner lane case" as occasion demands. Then, a threshold value associated with TTC or ETTC in the inner lane case, which is included in the operating condition, will be hereinafter referred to as an "inner lane threshold value" as occasion demands. A case where the vehicle 1 drives the curve on an outer side than the other vehicle does (refer to FIG. 2B and FIG. 2D), in other words, a case where the lane on which the vehicle 1 drives is outer than the lane on which the other vehicle drives, will be hereinafter referred to as an "outer lane case" as occasion demands. Then, a threshold value associated with TTC or ETTC in the outer lane case, which is included in the operating condition, will be hereinafter referred to as an "outer lane threshold value" as occasion demands.

The condition setting device 11 may set each of the outer lane threshold value and the inner lane threshold value such that the operating condition is more easily satisfied in the outer lane case than in the inner lane case. In other words, the condition setting device 11 may set each of the outer lane threshold value and the inner lane threshold value such that the operating condition is more hardly satisfied in the inner lane case than in the outer lane case.

Here, the threshold value associated with TTC or ETTC may vary, for example, depending on a curvature radius of the curve, a relative speed between the vehicle 1 and the other vehicle (i.e., the oncoming vehicle 2 or the parallel running vehicle 3), a lane width, or the like. Thus, the inner lane threshold value is not always smaller than the outer lane threshold value. For example, if the condition, which is the curvature radius of the curve, the relative speed between the vehicle 1 and the other vehicle, the lane width or the like, is the same, then, the condition setting device 11 may set the outer lane threshold value to be greater than the inner lane threshold value, so that the operating condition is more easily satisfied in the outer lane case than in the inner lane case. Alternatively, the condition setting device 11 may set the inner lane threshold value to be less than the outer lane threshold value, so that the operating condition is more hardly satisfied in the inner lane case than in the outer lane case.

Each of the inner lane threshold value and the outer lane threshold value may be determined on the basis of a transition in TTC or ETTC, which is obtained by simulations, for example, by using, as variables, the predicted courses of the vehicle 1 and the other vehicle (i.e., the oncoming vehicle 2 or the parallel running vehicle 3), the positional relation between the vehicle 1 and the other vehicle, the curvature radius of the curve, the relative speed between the vehicle 1 and the other vehicle, the lane width, or the like.

Next, the collision avoidance assist process performed by the collision avoidance assist apparatus 100 will be explained with reference to flowcharts in FIG. 3A and FIG. 3B.

Figure 3A:
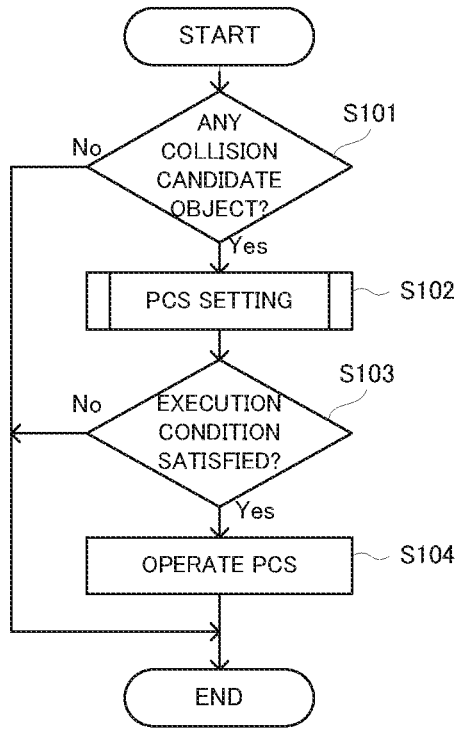
FIG. 3A is a flowchart illustrating a collision avoidance assist process according to the embodiment.

In FIG. 3A, the collision avoidance ECU 10 determines whether or not there is any collision candidate object (which is another vehicle on another lane that extends along the lane on which the vehicle 1 drives) on the basis of information obtained by the external sensor 21 observing a scene around the vehicle 1 (step S101). In the step S101, if it is determined that there is no collision candidate object (the step S101: No), the process illustrated in FIG. 3A is ended. Then, the step S101 is performed after a lapse of a predetermined period (e.g., several ten milliseconds to several hundred milliseconds). In other words, the process illustrated in FIG. 3A is repeated in cycles corresponding to the predetermined period.

In the step S101, if it is determined that there is the collision candidate object (the step S101: Yes), the condition setting device 11 performs pre-crash safety (PCS) setting (step S102).

Now the PCS setting will be explained with reference to the flowchart in FIG. 3B. In FIG. 3B, the condition setting device 11 determines whether or not a road ahead in the travel direction of the vehicle 1 of the lane on which the vehicle 1 drives is a curve section (step S1021). The existing technologies/techniques can be applied to determine whether or not the road ahead is the curve section. For example, a while line or a road edge may be detected from images captured or imaged by the camera included in the external sensor 21 to obtain a curvature radius of a road (or lane), and then, if the obtained curvature radius is within a predetermined range, it may be determined to be the curve section. Alternatively, whether or not the road ahead is the curve section may be determined on the basis of a position of the vehicle 1 obtained by the GPS included in the external sensor 21, the predicted course of the vehicle 1, and map information.

In the step S1021, if it is determined that it is not the curve section (i.e., a straight-line section) (the step S1021: No), the condition setting device 11 changes the threshold value associated with TTC or ETTC, to straight-line setting (typically, initial setting) (step S1022).

On the other hand, in the step S1021, if it is determined that it is the curve section (the step S1021: Yes), the condition setting device 11 calculates a trajectory of the collision candidate object on the basis of information obtained by the external sensor 21 observing the collision candidate object (step S1023). The trajectory of the collision candidate object is typically calculated as a trajectory on absolute coordinates.

The condition setting device 11 compares the position of the vehicle 1 with the trajectory of the collision candidate object, and determines whether or not the vehicle 1 drives the curve on an inner side than the collision candidate object does (step S1024). In the step S1024, if it is determined that the vehicle 1 drives the curve on the inner side than the collision candidate object does (the step S1024: Yes), the condition setting device 11 sets the threshold value associated with TTC or ETTC to the inner lane threshold value (step S1025). On the other hand, in the step S1024, if it is determined that the vehicle 1 does not drive the curve on the inner side than the collision candidate object does (i.e., that the vehicle 1 drives the curve on an outer side than the collision candidate objects does) (the step S1024: No), the condition setting device 11 sets the threshold value associated with TTC or ETTC to the outer lane threshold value (step S1026). The inner lane threshold value or the outer lane threshold value may be the same as or different from the threshold value associated with TTC or ETTC.

Back in FIG. 3A again, the collision avoidance controller 12 determines whether or not an execution condition associated with the collision avoidance assist operation is satisfied (step S103). Specifically, the collision avoidance controller 12 may determine whether or not the TTC or ETTC of the vehicle 1 for the collision candidate object (the oncoming vehicle 2 or the parallel running vehicle 3 in FIG. 2) is less than or equal to the threshold value set in the step S102.

In the step S103, if it is determined that the execution condition is satisfied (the step S103: Yes), the collision avoidance controller 12 performs the collision avoidance assist operation (step S104). On the other hand, in the step S103, if it is determined that the execution condition is not satisfied (the step S103: No), the process illustrated in FIG. 3A is ended. Then, the step S101 is performed after a lapse of the predetermined period.

Technical Effect

If the vehicle 1 drives the curve on the inner side than the other vehicle does, in other words, if the lane on which the vehicle 1 drives is inner than the lane on which the other vehicle drives, the inner lane threshold value is set on the collision avoidance assist apparatus 100 so that the operating condition for starting the collision avoidance assist operation is relatively hardly satisfied. By virtue of such a configuration, it is possible to prevent an unnecessary collision avoidance assist operation from being performed due to the other vehicle that crosses ahead in the travel direction of the vehicle 1 on the curve.

On the other hand, if the vehicle 1 drives the curve on the outer side than the other vehicle does, in other words, if the lane on which the vehicle 1 drives is outer than the lane on which the other vehicle drives, the outer lane threshold value is set on the collision avoidance assist apparatus 100 so that the operating condition for starting the collision avoidance assist operation is relatively easily satisfied. By virtue of such a configuration, the collision damage reducing effect by the collision avoidance assist apparatus 100 can be improved in a situation in which the track of the other vehicle is relatively highly likely shifted to the outside of the curve (i.e., the vehicle 1 side).

In other words, according to the collision avoidance assist apparatus 100, it is possible to appropriately perform the collision avoidance assist operation while preventing the collision avoidance assist operation from being performed even though the collision avoidance assist operation is unnecessary.

In the technology/technique described in the Patent Literature 2, on the premise of left-hand traffic, when the host vehicle enters a right curve (corresponding to the situation illustrated in FIG. 2B), the execution condition is changed to a condition in which the collision avoidance control is hardly performed, in comparison with a condition when the host vehicle enters a left curve (corresponding to the situation illustrated in FIG. 2A). In other words, the technology/technique described in the Patent Literature 2 is configured such that the collision avoidance control is hardly performed when the host vehicle drives the curve on the outer side than the oncoming vehicle does, in comparison with when the host vehicle drives the curve on the inner side than the oncoming vehicle does. It is configured in this manner because the technology/technique described in the Patent Literature 2 introduces a concept of "collision probability or likelihood".

Specifically, in the technology/technique described in the Patent Literature 2, if it is determined that the host vehicle is to collide with the oncoming vehicle on the basis of an estimated driving course of the oncoming vehicle, then, the oncoming vehicle is stored as the collision candidate object. Here, the more it is stored as the collision candidate object in its history (i.e., the longer a period in which it is stored as the collision candidate object is), the more the collision probability increases. Then, when the collision probability satisfies the execution condition, the collision avoidance control is performed. In such a condition, if the host vehicle drives the curve on the inner side than the oncoming vehicle does, the estimated driving course of the oncoming vehicle is rarely directed to the host vehicle. Thus, the collision probability hardly improves, and there is little chance to satisfy the execution condition. On the other hand, if the host vehicle drives the curve on the outer side than the oncoming vehicle does, the estimated driving course of the oncoming vehicle is directed to the host vehicle in many cases, and thus, the collision probability easily improves, and there are more chances to satisfy the execution condition, even though the collision avoidance control is unnecessary. Therefore, the execution condition is relieved so that the collision avoidance control is easily performed if the host vehicle drives the curve on the inner side than the oncoming vehicle does, whereas the execution condition is strictly set so that an unnecessary collision avoidance control is prevented if the host vehicle drives the curve on the outer side than the oncoming vehicle does.

The collision avoidance assist apparatus 100 does not introduce the concept of the "collision probability" associated with the Patent Literature 2. Thus, the problem described in the Patent Literature 2 does not occur, even when the inner lane threshold value is set so that the operating condition for starting the collision avoidance assist operation is relatively hardly satisfied if the host vehicle drives the curve on the inner side than the other vehicle does, and the outer lane threshold value is set so that the operating condition is relatively easily satisfied if the host vehicle drives the curve on the outer side than the other vehicle does.

MODIFIED EXAMPLE

Figure 3B:
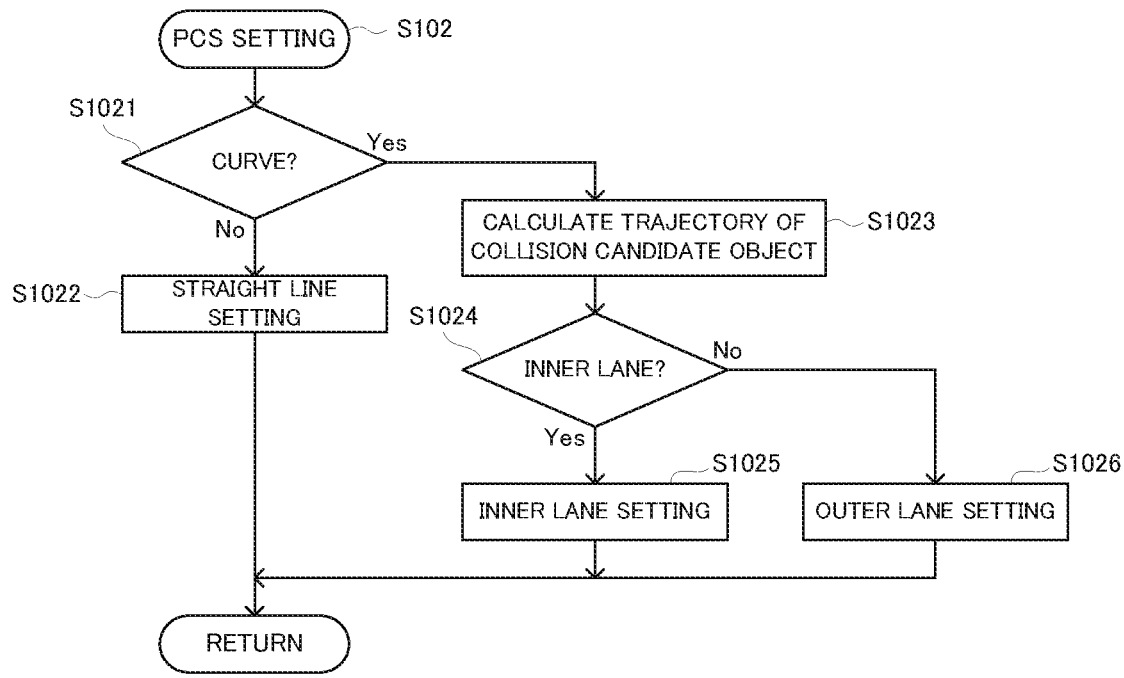
FIG. 3B is a flowchart illustrating pre-crash safety (PCS) setting according to the embodiment.
Figure 4A:
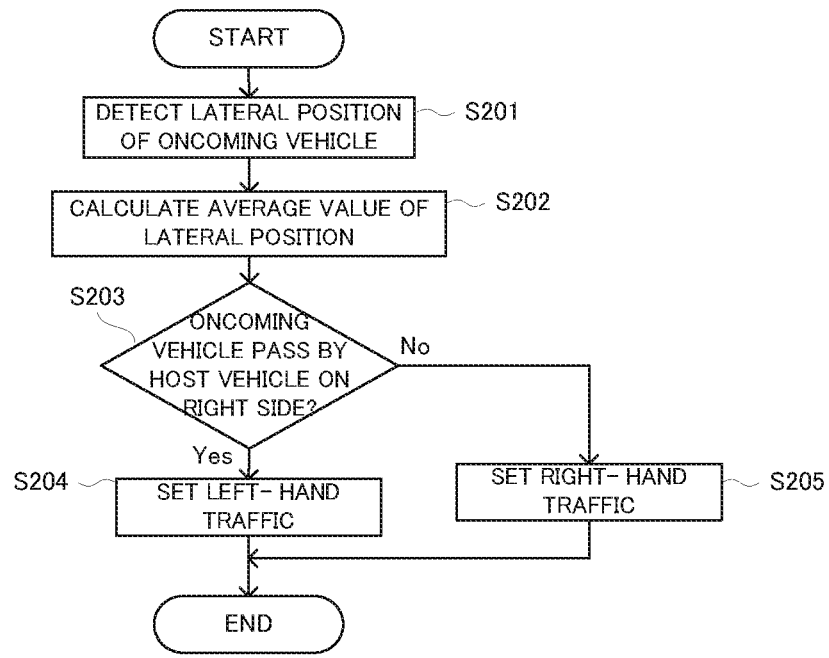
FIG. 4A is a flowchart illustrating a collision avoidance assist process according to a modified example of the embodiment.
Figure 4B:
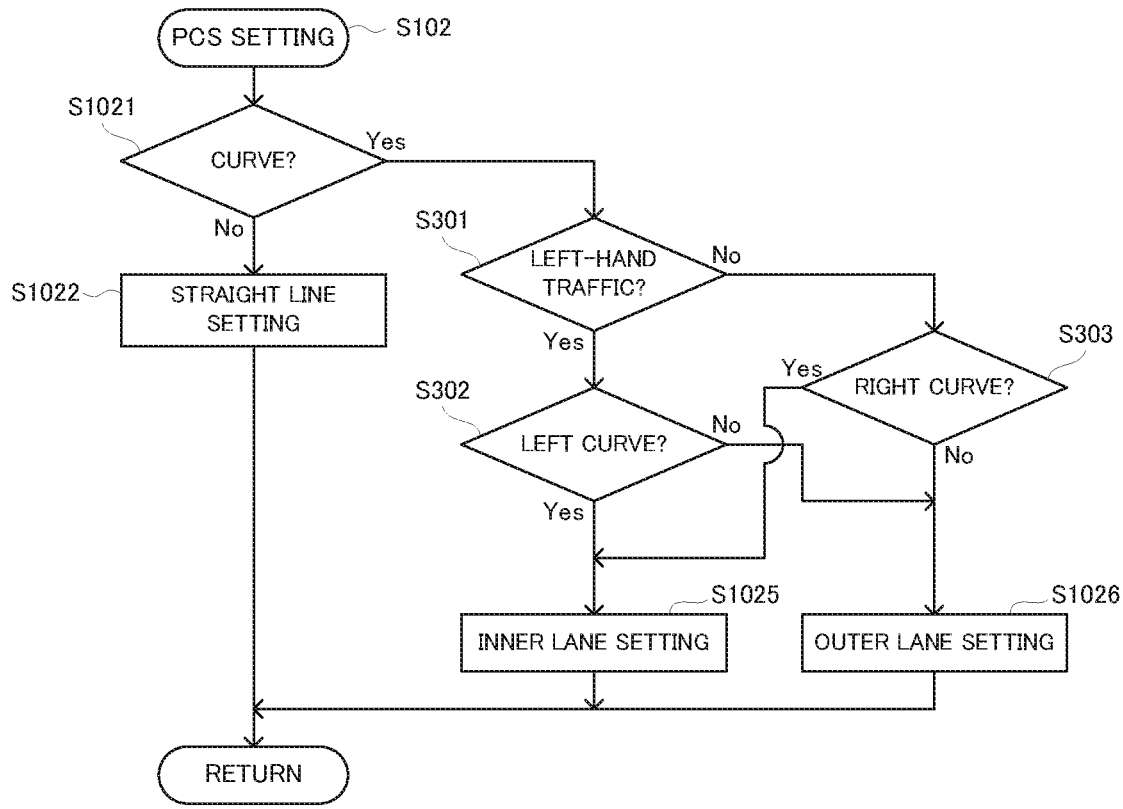
FIG. 4B is a flowchart illustrating PCS setting according to the modified example of the embodiment.

If a road on which the vehicle 1 drives has, for example, one lane on each side (i.e., if it is sufficient to consider only the oncoming vehicle 1), processes illustrated in flowcharts in FIG. 4A and FIG. 4B may be performed, instead of the processes illustrated in the flowcharts in FIG. 3A and FIG. 3B. The process illustrated in FIG. 4A is a process for determining whether it is left-hand traffic or right-hand traffic, and is performed mainly while the vehicle 1 drives in the straight-line section. The process illustrated in FIG. 4B is a process corresponding to the process illustrated in FIG. 3B.

In FIG. 4A, the condition setting device 11 detects a lateral position of the oncoming vehicle on the basis of information obtained by the external sensor 21 observing the oncoming vehicle (step S201). In the step S201, the lateral position of the oncoming vehicle is detected a plurality of times at predetermined sampling intervals. The condition setting device 11 then calculates an average value of the lateral position of the oncoming vehicle on the basis of a result of the step S201 (step S202). In the step S202, instead of the average value of the lateral position of the oncoming vehicle, for example, a maximum value, a minimum value, and a median of the lateral position, or a lateral position with a relatively high frequency of appearance may be obtained.

The condition setting device 11 then determines whether or not the oncoming vehicle passes by the vehicle 1 on the right side in the travel direction, on the basis of a result of the step S202 (step S203). In the step S203, if it is determined that the oncoming vehicle passes by the vehicle 1 on the right side in the travel direction (the step S203: Yes), the condition setting device 11 sets left-hand traffic for the road on which the vehicle 1 drives (step S204). On the other hand, in the step S203, if it is determined that the oncoming vehicle does not pass by the vehicle 1 on the right side in the travel direction (the step S203: No), the condition setting device 11 sets right-hand traffic for the road on which the vehicle 1 drives (step S205).

If road information including traffic regulation information can be obtained from an apparatus mounted outside the vehicle 1 (e.g., if a so-called infrastructure cooperation system can be used), the condition setting device 11 may set the left-hand traffic or the right-hand traffic by obtaining the road information, instead of the process illustrated in FIG. 4A.

In the step S1021 in FIG. 4B, if it is determined that it is the curve section (the step S1021: Yes), the condition setting device 11 determines whether or not it is the left-hand traffic (step S301). In the step S301, if it is determined that it is the left-hand traffic (the step S301: Yes), the condition setting device 11 determines whether or not the curve section is a left curve (step S302).

In the step S302, if it is determined that it is the left curve (the step S302: Yes), the condition setting device 11 sets the threshold value associated with TTC or ETTC to the inner lane threshold value (step S1025). On the other hand, in the step S302, if it is determined that it is not the left curve (i.e., that it is a right curve) (the step S302: No), the condition setting device 11 sets the threshold value associated with TTC or ETTC to the outer lane threshold value (step S1026).

In the step S301, if it is determined that it is not the left-hand traffic (i.e., that it is the right-hand traffic) (the step S301: No), the condition setting device 11 determines whether or not the curve section is a right curve (step S303).

In the step S303, if it is determined that it is the right curve (the step S303: Yes), the condition setting device 11 sets the threshold value associated with TTC or ETTC to the inner lane threshold value (the step S1025). On the other hand, in the step S303, if it is determined that it is not the right curve (i.e., that it is a left curve) (the step S303: No), the condition setting device 11 sets the threshold value associated with TTC or ETTC to the outer lane threshold value (the step S1026).

If road information including the road shape can be obtained from an apparatus mounted outside the vehicle 1 (e.g., if the so-called infrastructure cooperation system can be used), the condition setting device 11 may determine whether or not the road ahead is the curve section by obtaining the road information in each of the steps S1021, S302, and S303. In this case, in addition to or instead of the information obtained by the external sensor 21, information obtained from an apparatus mounted outside the vehicle 1 may be used to determine the presence/absence of the oncoming vehicle.

Various aspects of embodiments of the present disclosure derived from the embodiment and modified example explained above will be explained hereinafter.

A collision avoidance apparatus according to an aspect of embodiments of the present disclosure is a collision avoidance assist apparatus configured to perform a collision avoidance assist operation for avoiding a collision between a host vehicle and an object around the host vehicle if a time to collision, which is a time until the host vehicle collides with the object, satisfies a predetermined operating condition, the collision avoidance assist apparatus provided with: a determinator configured to determine whether or not one lane on which the host vehicle drives is inner than another lane that extends along the one lane and that a moving body as the object exists, in a curve section, if there is the curve section ahead in a travel direction of the host vehicle; and a changer configured to change the operating condition such that a first condition, which is the operating condition in a first case in which it is determined that the one lane is not inner than the other lane in the curve section, is more easily satisfied than a second condition, which is the operating condition in a second case in which it is determined that the one lane is inner than the other lane in the curve section.

In the aforementioned embodiment, the "condition setting device 11" corresponds to an example of the "determinator" and the "changer". The "oncoming vehicle 2" and the "parallel running vehicle 3" in the aforementioned embodiment corresponds to an example of the "moving body (on another lane)". The "TTC" and the "ETTC" in the aforementioned embodiment correspond to an example of the "time to collision". The "outer lane threshold value" and the "inner lane threshold value" in the aforementioned embodiment respectively correspond to an example of the "first condition" and the "second condition". There may be a third lane between the "one lane" and the "other lane".

The collision avoidance assist apparatus adopts the time to collision, as an index indicating the possibility of the collision between the host vehicle and the object. A smaller time to collision means a larger possibility of the collision. When the time to collision satisfies the predetermined operating condition, the collision avoidance assist operation is performed.

The first case is a case in which the host vehicle drives a curve on the outer side than the moving body on the other lane does. In the first case, the moving body turns along the curve, and thus, if a distance between the host vehicle and the moving body is relatively close, a predicted course of the host vehicle rarely crosses a predicted course of the moving body. As a result, in the first case, the time to collision does not become very small (i.e., the possibility of the collision based on the time to collision does not increase much).

The second case is a case in which the host vehicle drives the curve on the inner side than the moving body on the other lane does. In the second case, as a result of the moving body turning along the curve, the host vehicle moves toward the moving body that passes ahead of the host vehicle. Thus, the time to collision easily becomes relatively small (i.e., the possibility of the collision based on the time to collision becomes relatively high).

If the operating condition is the same between the first case and the second case, the collision avoidance assist operation is more hardly performed in the first case than in the second case. In other words, the collision avoidance assist operation is more easily performed in the second case than in the first case.

By the way, in the first case, a track of the moving body is relatively highly likely shifted to the outside of the curve (i.e., to the host vehicle side) due to a centrifugal force acting on the moving body. In other words, in the first case, an actual possibility of the collision between the host vehicle and the moving body is relatively high even though the time to collision is not that small. On the other hand, in the second case, the track of the moving body is relatively less likely shifted to the inside of the curve (i.e., the host vehicle side) due to the centrifugal force acting on the moving body. In other words, in the second case, the actual possibility of the collision between the host vehicle and the moving body is relatively low even though the time to collision tends to be relatively small.

As described above, in the curve section, a correlation between the possibility of the collision indicated by the time to collision and the actual possibility of the collision varies in the first case and in the second case. When the operating condition is the same between the first case and the second case, if the operating condition is set to be suited for the first case, for example, such that the collision avoidance assist operation is appropriately performed in the first case, then, there is a possibility that an unnecessary collision avoidance assist operation is performed in the second case. Alternatively, when the operating condition is the same between the first case and the second case, if the operating condition is set to be suited for the second case, for example, such that the collision avoidance assist operation is appropriately performed in the second case, then, there is a possibility that the collision damage reducing effect expected in the first case cannot be obtained.

Thus, on the collision avoidance assist apparatus, the operating condition is changed such that the first condition, which is the operating condition in the first case, is more easily satisfied than the second condition, which is the operating condition in the second case. If the first condition is set to be more easily satisfied than the second condition, the collision avoidance assist operation is performed even if the time to collision in the first case does not become very small. In other words, in the first case in which the time to collision does not become vehicle small, the collision avoidance assist operation is appropriately performed. On the other hand, if the second condition is set to be more hardly satisfied than the first condition, the execution of the collision avoidance assist operation is suppressed even if the time to collision in the second case tends to be relatively small. In other words, in the second case in which the time to collision tends to be relatively small, it is possible to prevent an unnecessary collision avoidance assist operation from being performed. Therefore, according to the collision avoidance assist apparatus, it is possible to appropriately perform the collision avoidance assist operation while preventing the collision avoidance assist operation from being performed even though the collision avoidance assist operation is unnecessary.

In an aspect of the collision avoidance apparatus, the changer is configured to perform at least one of (i) changing the operating condition such that the first condition is more easily satisfied than the second condition, and (ii) changing the operating condition such that the second condition is more hardly satisfied than the first condition. According to this aspect, it is possible to set the first condition to be more easily satisfied than the second condition, relatively easily.

In this aspect, the operating condition may include a threshold value associated with the time to collision. By virtue of such a configuration, the operating condition can be changed by changing the threshold value, which is extremely useful in practice.

In another aspect of the collision avoidance apparatus, a travel direction associated with the other lane is opposite to a travel direction associated with the one lane. According to this aspect, it is possible to appropriately perform the collision avoidance assist operation on an oncoming vehicle, which is the moving body on the other lane.

Alternatively, in another aspect of the collision avoidance apparatus, a travel direction associated with the other lane is equal to a travel direction associated with the one lane. According to this aspect, it is possible to appropriately perform the collision avoidance assist operation on a parallel running vehicle, which is the moving body on the other lane.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A collision avoidance assist apparatus configured to perform a collision avoidance assist operation for avoiding a collision between a host vehicle and an object around the host vehicle if a time to collision, which is a time until the host vehicle collides with the object, satisfies a predetermined operating condition, said collision avoidance assist apparatus comprising:
    a determinator configured to determine whether or not one lane on which the host vehicle drives is inner than another lane that extends along the one lane and that a moving body as the object exists, in a curve section, if there is the curve section ahead in a travel direction of the host vehicle; and
    a changer configured to change the operating condition such that a first condition, which is the operating condition in a first case in which it is determined that the one lane is not inner than the other lane in the curve section, is more easily satisfied than a second condition, which is the operating condition in a second case in which it is determined that the one lane is inner than the other lane in the curve section.

2. The collision avoidance assist apparatus according to claim 1, wherein said changer is configured to perform at least one of (i) changing the operating condition such that the first condition is more easily satisfied than the second condition, and (ii) changing the operating condition such that the second condition is more hardly satisfied than the first condition.

3. The collision avoidance assist apparatus according to claim 2, wherein the operating condition includes a threshold value associated with the time to collision.

4. The collision avoidance assist apparatus according to claim 2, wherein a travel direction associated with the other lane is opposite to a travel direction associated with the one lane.

5. The collision avoidance assist apparatus according to claim 2, wherein a travel direction associated with the other lane is equal to a travel direction associated with the one lane.

6. The collision avoidance assist apparatus according to claim 1, wherein the operating condition includes a threshold value associated with the time to collision.

7. The collision avoidance assist apparatus according to claim 6, wherein a travel direction associated with the other lane is opposite to a travel direction associated with the one lane.

8. The collision avoidance assist apparatus according to claim 6, wherein a travel direction associated with the other lane is equal to a travel direction associated with the one lane.

9. The collision avoidance assist apparatus according to claim 1, wherein a travel direction associated with the other lane is opposite to a travel direction associated with the one lane.

10. The collision avoidance assist apparatus according to claim 1, wherein a travel direction associated with the other lane is equal to a travel direction associated with the one lane.

* * * * *